United States Patent
Prechner et al.

(10) Patent No.: US 10,050,770 B2
(45) Date of Patent: Aug. 14, 2018

(54) POSITIONING SYSTEM CONFIGURATION WITH ROUND TRIP TIME

(71) Applicant: Intel Corporation, Santa Clara, CA (US)

(72) Inventors: Gaby Prechner, Rishon LeZion (IL); Itai Steiner, Tel Aviv (IL); Elad Eyal, Shoham (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/279,529

(22) Filed: Sep. 29, 2016

(65) Prior Publication Data

US 2018/0091286 A1 Mar. 29, 2018

(51) Int. Cl.
| | |
|---|---|
| H04L 7/00 | (2006.01) |
| H04L 12/26 | (2006.01) |
| H04W 64/00 | (2009.01) |
| H04W 4/02 | (2018.01) |
| H04L 29/08 | (2006.01) |

(52) U.S. Cl.
CPC ........ H04L 7/0016 (2013.01); H04L 43/0864 (2013.01); H04W 4/02 (2013.01); H04W 64/00 (2013.01); H04L 67/18 (2013.01)

(58) Field of Classification Search
CPC ..... H04W 24/00; H04W 84/12; H04W 64/00; H04W 4/02
USPC ............................... 375/350, 356; 455/456.1
See application file for complete search history.

(56) References Cited

U.S. PATENT DOCUMENTS

| | | | |
|---|---|---|---|
| 9,250,312 B1 | 2/2016 | Knibbe et al. | |
| 2013/0141233 A1* | 6/2013 | Jacobs | G08B 19/00 340/521 |
| 2013/0336131 A1 | 12/2013 | Zhang et al. | |
| 2014/0178257 A1* | 6/2014 | Haizmann | C10G 47/26 422/140 |
| 2014/0254511 A1* | 9/2014 | Aldana | H04W 56/003 370/329 |
| 2015/0071121 A1 | 3/2015 | Patil et al. | |
| 2016/0081054 A1 | 3/2016 | Zhang et al. | |

(Continued)

OTHER PUBLICATIONS

International Search Report based on application No. PCT/US2017/046677, dated Nov. 14, 2017, (17 pages) (Reference Purpose Only).

*Primary Examiner* — Kevin M Burd
(74) *Attorney, Agent, or Firm* — Viering, Jentschura & Partner mbB

(57) ABSTRACT

Indoor positioning networks are faced with several challenges. The methods employed by many indoor positioning systems require highly accurate time synchronization. Where many responders must be synchronized together, the accuracy of the time-synchronization can be improved via a synchronization tree that identifies preferable paths to synchronize responders and eliminates ambiguity. Moreover, where absolute location information is available for less than all of the responders, accurate round trip time measurement can be used to obtain the relative locations of the responders to each other. Where the relative locations are known, any absolute location of a responder can be extrapolated to the remaining responders. Finally, with the use of appropriate algorithms, these round trip time measurements can be collected in reference to a device that is stationary or moving.

13 Claims, 8 Drawing Sheets

(56) References Cited

U.S. PATENT DOCUMENTS

2016/0150537 A1   5/2016   Jung et al.
2017/0006422 A1*  1/2017   Kim ........................ G01S 11/16

* cited by examiner

FIG. 2
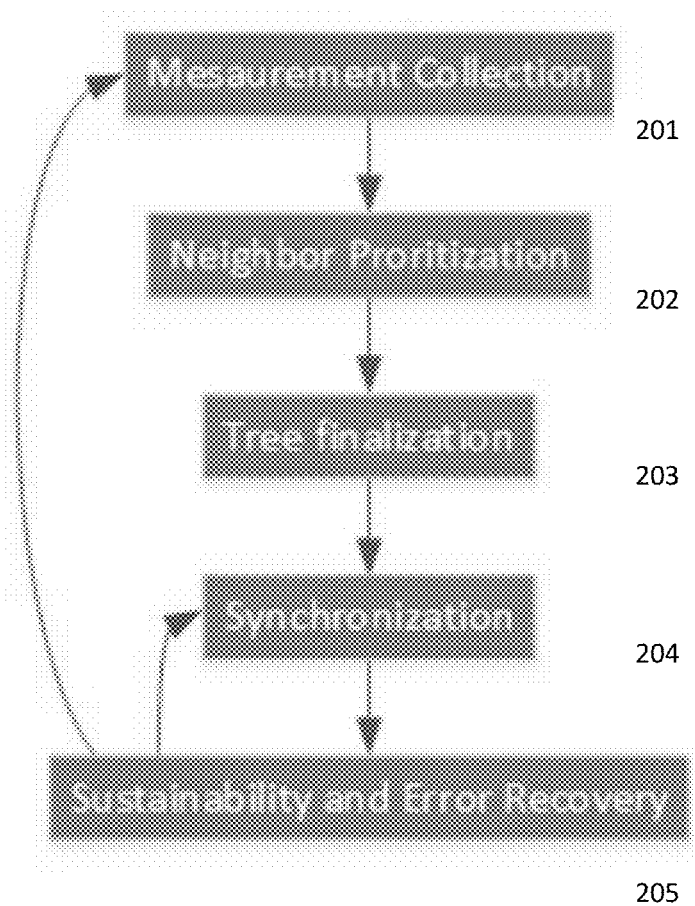
201 Measurement Collection
202 Neighbor Prioritization
203 Tree Initialization
204 Synchronization
205 Sustainability and Error Recovery
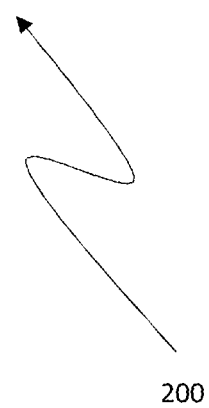
200

POSITIONING SYSTEM CONFIGURATION WITH ROUND TRIP TIME

TECHNICAL FIELD

Embodiments described herein generally relate to the use of wireless technology to determine the location of objects in an indoor setting.

BACKGROUND

Outdoor navigation using Global Navigation Systems ("GNSS") is largely known. The technology is widespread and regularly used. Many indoor navigation and positioning systems rely on having accurate positioning information for indoor infrastructure elements, such as wireless responders. These systems may rely on the measurement of a transmission time to determine an approximate distance, which is then compared with known positioning information to determine the location of a client device. For these systems, the responders must be very accurately time-synchronized. Accordingly, there is a need for a way to accurately time-synchronize, particularly over a large indoor positioning system implementation.

Furthermore, where accurate positioning information is not available, or where it is not relied upon in a positioning system installation, it may not be possible to track a client device's absolute position. Thus, there is a need to track the relative position of a client device, as it relates to a network of responders. Moreover, even though modern standards, such as Fine Time Measurements ("FTM"), allow for very accurate measurements of transmission time between a client device and a responder, not all devices are capable of FTM, nor is FTM desirable in all situations. Accordingly, there is a need to create a positioning system that can be used without FTM, such as on legacy devices.

SUMMARY

One aspect of this Disclosure provides a method and apparatus for responders to use round trip time measurements to achieve nanosecond level time synchronization to improve accuracy of a positioning network. Another aspect of this Disclosure provides a method and apparatus for determining positioning information for a client device where accurate location information of responders is unknown. Another aspect of this Disclosure provides a method and apparatus for determining positional information for a legacy client device that is not FTM enabled.

Turning to the issue of time synchronization, high accuracy synchronization is critical for certain implementations of positioning systems, particularly where the positioning systems require a plurality of responders to act in a synchronized manner, or to transmit synchronized time data. Although there are known methods for synchronizing a pair of devices with high accuracy, synchronizing many responders presents additional challenges. Where the synchronizing of multiple responders is required, the accuracy can be improved by creating a "synchronization tree" that identifies the most rapid method to synchronize responders to one another in series, and which eliminates ambiguity or redundancy in the synchronization route.

Many positioning networks rely on accurate, absolute positions for the network's responders, so that a corresponding position of a client device can be calculated. Accurate absolute position information may not be available or easily accessible. Where absolute position information is not available, the relative position of a user device within a positional network can be obtained using a series of timing measurements. Once the relative locations of the responders have been obtained, any one absolute location of the responders can be extrapolated to apply to each responder. Finally, this Disclosure considers that real world implementations of positioning networks may only be able to obtain timing information from mobile or locomoting user devices. Where is it necessary to determine relative location based on a series of moving data points, an algorithm, such as a Simultaneous Localization and Mapping algorithm, can be used.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 2 shows a flowchart for establishing a synchronization tree.

DETAILED DESCRIPTION

Figure 1:
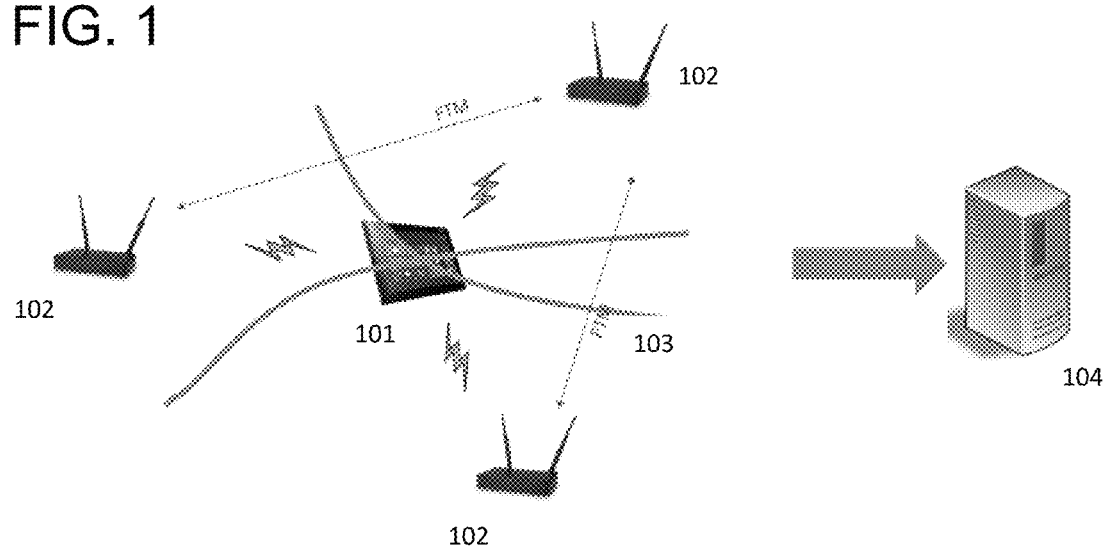
FIG. 1 shows the establishment a synchronization tree.

The following detailed description refers to the accompanying drawings that show, by way of illustration, specific details and embodiments in which the invention may be practiced.

The word "exemplary" is used herein to mean "serving as an example, instance, or illustration." Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions which will be described below in further detail may also be understood as a "circuit". It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "sensing network element" is used in this application synonymously with the terms "responder," "network responder," and "station." It is understood that the "location sensing network" comprises a plurality of wireless communication devices which, among other things, respond to requests for timing or positional data. For the sake of convenience, these elements are generally referred to as "responders." Where one term is used instead of the other, no distinction is intended, and any reference to one of these terms shall be construed as reference to each of them.

The term "client device" may be understood to mean any mobile device within the positioning network, for which a position is being sought. It is generally considered that the client device will be a user device, an end-user device, or a terminal device. In the context of an indoor positioning network, this may be, but is not limited to, a mobile phone, a tablet computer, or a wearable computer.

The transmissions that are described herein, including, but not limited to, Fine Time Measurement, round trip time, Time Difference of Arrival, Observed Time Difference of Arrival, and any and all "timing information," is intended to be transmitted wirelessly through any method of wireless transmission. The wireless transmission may be achieved through Wi-Fi, WLAN, Bluetooth, or any other means.

FIG. 1 shows the establishment a synchronization tree according to one aspect of the Disclosure. A client device 101 receives transmissions from a plurality of responders 102 related to the establishment of a synchronization tree. During this procedure, each responder 102 scans for other responders 102 within a range of wireless connectivity. This discovery may be achieved via Wi-Fi 802.11, a scanning procedure, NAN discovery, or another mechanism to detect neighboring beacons. According to another aspect of the disclosure, the client device 101 may perform this scan for other responders 102 via the methods described above. According to one aspect of the Disclosure, the client device 101 may also serve as an FTM responder for the purposes of establishing a synchronization tree. It is noted that, although the client device 101 is shown in FIG. 1, the presence of a client device is not necessary for the establishment of a synchronization tree. Where a client device is absent, or where the client device is present but not a participant in the synchronization tree, the synchronization tree may be created among the responders 102.

An FTM communication 103 is initiated between the responders 102. According to one aspect of the disclosure, this is an 801.11 FTM procedure. According to a second aspect of the disclosure, this is any communication that provides the round trip time between two responders 102. This procedure is repeated until a round trip time, by whichever method used, is obtained between every available connection between responders 102.

According to another aspect of the Disclosure, Location Configuration Information ("LCI") is transmitted to the client device 101, or to a position engine server 104, along with the round trip times. The position engine server 104 may be separate from the responders 102 and client device 101, or it may be an aspect of the responders 102 or the client device 101. The position engine service 104 may be hardware, such as a CPU, or software. The LCI may be transmitted as part of the FTM procedure; collected via another 802.11 mechanism, such as Access Network Query Protocol, or obtained via another mechanism.

FIG. 2 shows a flowchart for establishing a synchronization tree 200. Measurement collection 201 comprises the searching for other responders, transmission of FTM or round trip time, and the transmission of LCI. Neighbor prioritization 202 comprises the assessment of the data received in measurement collection 201 to establish calculations of distance between the responders 102, and then grading, ranking, or prioritizing this data. As described, and according to one aspect of the Disclosure, Distances between the responders 102 are calculated via both round trip time and LCI. With respect to round trip time, the signal between responders is expected to travel generally at the speed of light. As such, the known formula distance=velocity·time can be employed to determine a distance between two responders 102 using the round trip time. Furthermore, because the LCI comprises a latitude and a longitude, it provides an exact geographical location, and the distance between two responders can be determined based on assessment of their respective LCIs.

Once the distances between each responder 102 are obtained by both round trip time and LCI, these distances are compared and prioritized, ranked, or graded for each pair of responders 102. For each connection between responders 102, the calculated distance based on round trip time is compared to the calculated distance for LCI and evaluated for similarity. A difference between these calculated distances may likely result from a synchronization error. These connections are then graded or ordered by synchronization error, where the connections with the smallest synchronization error, and thereby with the most similar calculated distances via round trip time and LCI, are given a higher ranking or grade. Those connections with the largest synchronization error are given a lower ranking or grade. Where more than one pair of responders 102 has the same synchronization error, then the pair of responders 102 with the shortest distance is given the higher ranking or grade. These rankings or grades may be calculated locally or remotely.

The rankings are translated to an order of connections between responders during the tree finalization 203. In this stage, a minimum spanning tree ("MST") is calculated based on the rankings or grades. The MST identifies the optimal paths by which the time-synchronization between responders 102 will be achieved. In this case, the MST considers the most advantageous paths to perform synchronization based on the paths that will result in the lowest synchronization error. The MST is calculated by an algorithm. Multiple MST algorithms are known in the art, and an MST algorithm may be chosen to meet the needs of the implementation.

With the MST in place, the synchronization 204 phase is carried out. In this stage, synchronization using FTM is performed over pairs of FTM-enabled responders, according to the order of synchronization created in the tree finalization 203 step, using the MST.

Periodically, the system must perform the sustainability and error recovery 205 step. The clock of each responder drifts, and this drifting occurs at different rates for each responder, which requires periodic re-synchronization. The time between each iteration is a tradeoff between air utilization and clock drift. A predetermined threshold can be set, whereby re-synchronization will be performed upon the synchronization falling beneath this threshold. Moreover, certain events can trigger error within the synchronization and therefore require re-synchronization. These may include one or more responders failing; the position of one or more responders changing; substantial changes of the objects within the environment of the responders, or substantial changes of the building or environment where the responders are located. For example, this could include changes in the environment, such as where a single room becomes partitioned into two or more smaller rooms.

Figure 3:
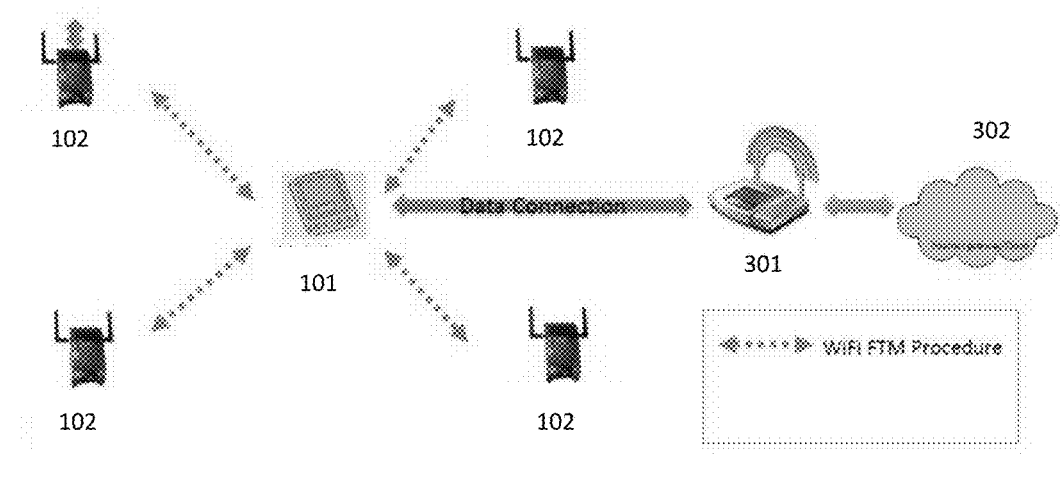
FIG. 3 shows the establishment of relative location data with a client device.

FIG. 3 shows a step of establishing a positioning system 300, according to one embodiment. In this positioning system, a client device 101 is positioned within wireless range of a plurality of responders 102. The client device 101 and the responders 102 transmit FTM data, which permits a calculation of the distance between the client device 101 and the responders 102. Although the term FTM is used, this may be achieved with any method that provides a round trip time between the client device and the responder. This can be achieved while connected to the internet, such as with an internet access point 301 and connection from the access point to the internet 302. Alternatively, this may be achieved without an internet connection, as long as a wireless connection can be established between the client device 101 and the responders 102. According to one aspect of the disclosure, the LCI is available and can be transmitted from the responders. According to a second aspect of the disclosure, the LCI is not available or cannot be transmitted by the responders. Where the LCI is not available, then multiple FTM measurements must be performed.

Figure 4:
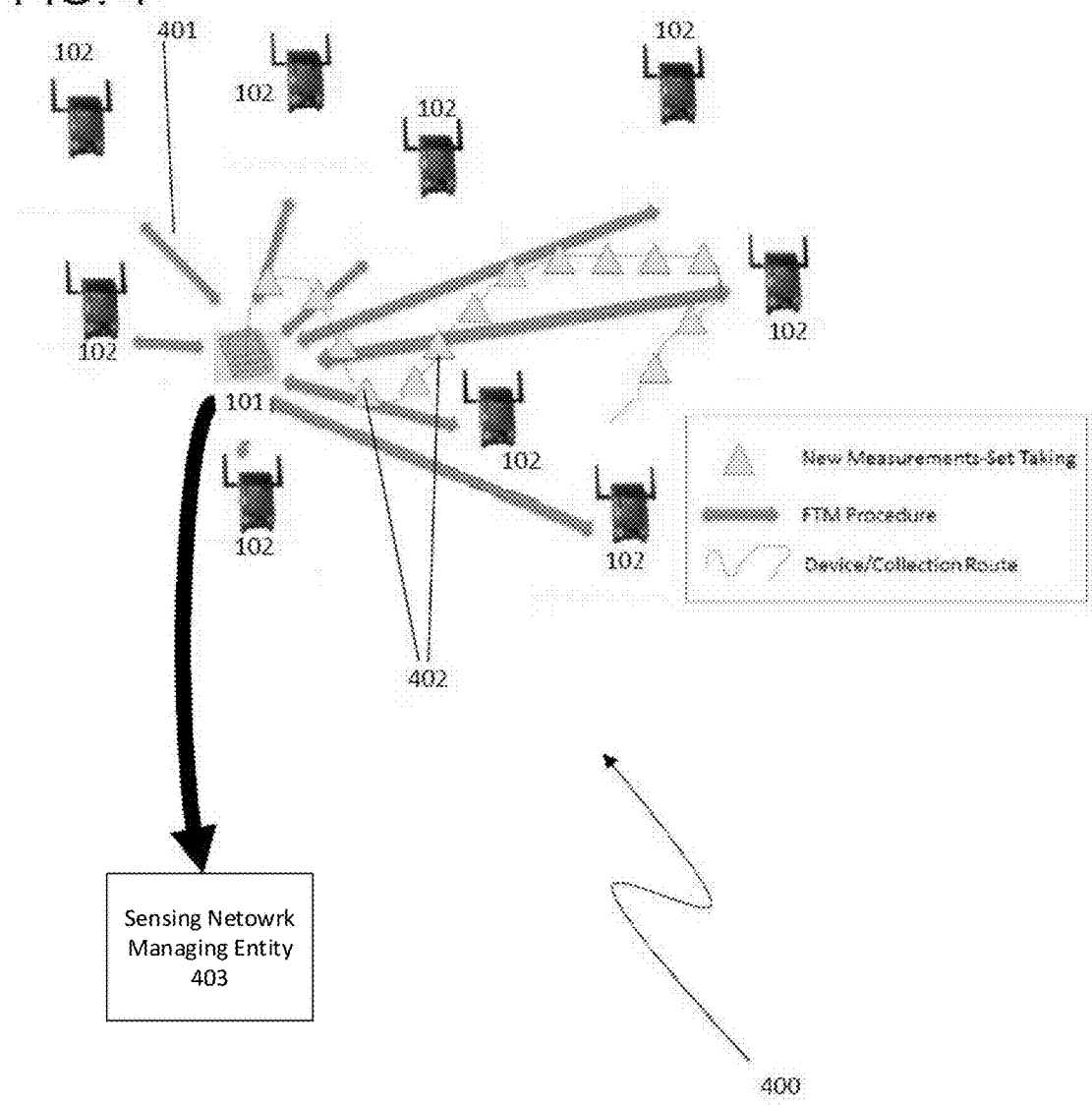
FIG. 4 shows the establishment of relative location data with a locomoting client device.

FIG. 4 shows a method of obtaining locational information, according to an embodiment of the Disclosure. This procedure may be appropriate where LCI is not available, or where LCI cannot be transmitted. Where this procedure is employed, several FTM measurements 103 are obtained between the client device and the responders while the client device is in motion. The locomotion of the client device causes the distance between the client device and the responders to increase or decrease, and this results in corresponding changes to the FTM measurements between the client device and the responders. When a plurality of FTM measurements has been obtained 401 during the locomotion of the client device 402, this data can be assessed to obtain the relative locations of the responders with respect to one another. This data may be sent to a Sensing Network Managing Entity ("SNME") 403, where the data is then post-processed and/or stored. The SNME may be a separate server or CPU, or it may be a portion of a responder or the client device. Alternatively, and according to another aspect of the disclosure, it is software instructions that can be located on any of the aforementioned devices.

Figure 5:
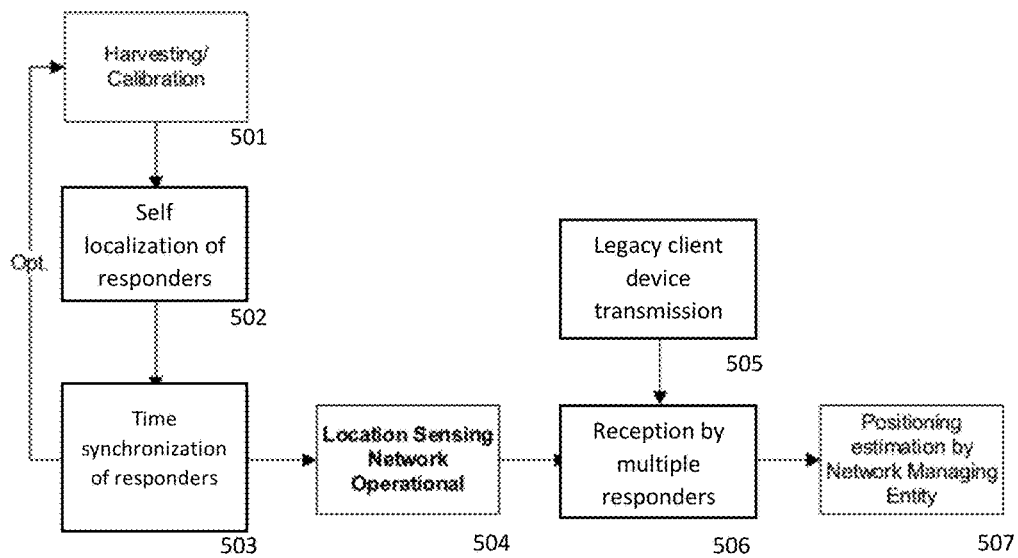
FIG. 5 shows a method diagram for a positioning system.

FIG. 5 shows a method of obtaining positional data according to this embodiment. The procedure depicted in FIG. 4 is represented in the first step of FIG. 5, entitled Harvesting/Calibration 501. As stated, in this step, FTM results between a plurality or responders and a dynamic (locomoting) client device. According to one aspect of the disclosure, the client device will initiate multiple FTM procedures with surrounding responders within a short interval, such as less than one second. This ability to initiate multiple FTM procedures within a short period may be useful where the client device is moving, as rapid receipt of FTM results allows for the FTM results to correspond to FTM samples where the client device is in a similar or substantially identical position. The measurement set for the FTM is taken from a specific client device position. The measurement set is then sent to the SNME for storage and post-processing. Although a plurality of measurements is necessary, the measurements may be taken by a single device that moves within the network, or by multiple devices. Where the FTM data is obtained by multiple devices, one or more of said devices may be stationary. According to one aspect of the disclosure, the FTM information can be obtained in a crowdsourcing fashion, whereby a plurality of client devices provides FTM information at or near the same time, from a plurality of locations.

In the self-localization of responders 502 stage, the SNME assesses the FTM data received during the harvesting/calibration 501 stage and calculates an estimation of the various responder positions. This may be achieved with a Simultaneous Localization and Mapping ("SLAM") algorithm, which is a means for constructing a map of an unknown environment while simultaneously tracking an agent's location within the map. There are a plurality of SLAM-type or similar algorithms that are known in the art, and a suitable algorithm can be selected as desired. This procedure uses the accurate range results derived from 802.11 RevMC ToF/FTM procedures, and introduces them into the SLAM or similar equations. This process can be reiterated using different measurement sets taken from different physical positions on the venue. Using this process, the SLAM algorithm, or a similar algorithm, will produce an estimation of the various responders, which will eventually converge to the real position.

The self-localization of responders 502 stage and/or the harvesting/calibration 501 stage may be repeated over time until the convergence rate decreases to an acceptable level, that is, until the locations of the responders converges sufficiently.

The time synchronization of responders 503 step, requires accurate time synchronization for the various deployed responders. The 802.11 FTM measurement procedure can be used to time sync between the responders. According to one aspect of the Disclosure, the pair-wise distances that were calculated in the self-localization of responders 502 step may be compared against the result of the FTM procedure between the two elements. The comparison yields an approximation of the time-sync error.

After completing the harvesting/calibration 501, the self-localization of responders 502, and the time synchronization of responders 503, the network may proceed with the Location Sensing Network Operational 504 step. During this step, the responders are time synched, and the location of the responders is known.

With the location sensing network being operational, the network can locate any legacy client device transmission 505 using Time Difference of Arrival ("TDOA"). Although the initial set-up and mapping procedures 501 and 502 may require a FTM or similar function, once the network is established, continued location sensing may be conducted with legacy devices, or other devices that may not be capable of FTM or similar. Also, for devices that are capable of both TDOA and FTM, the reliance of TDOA rather than FTM may result in a decrease of power expenditure.

Figure 6:
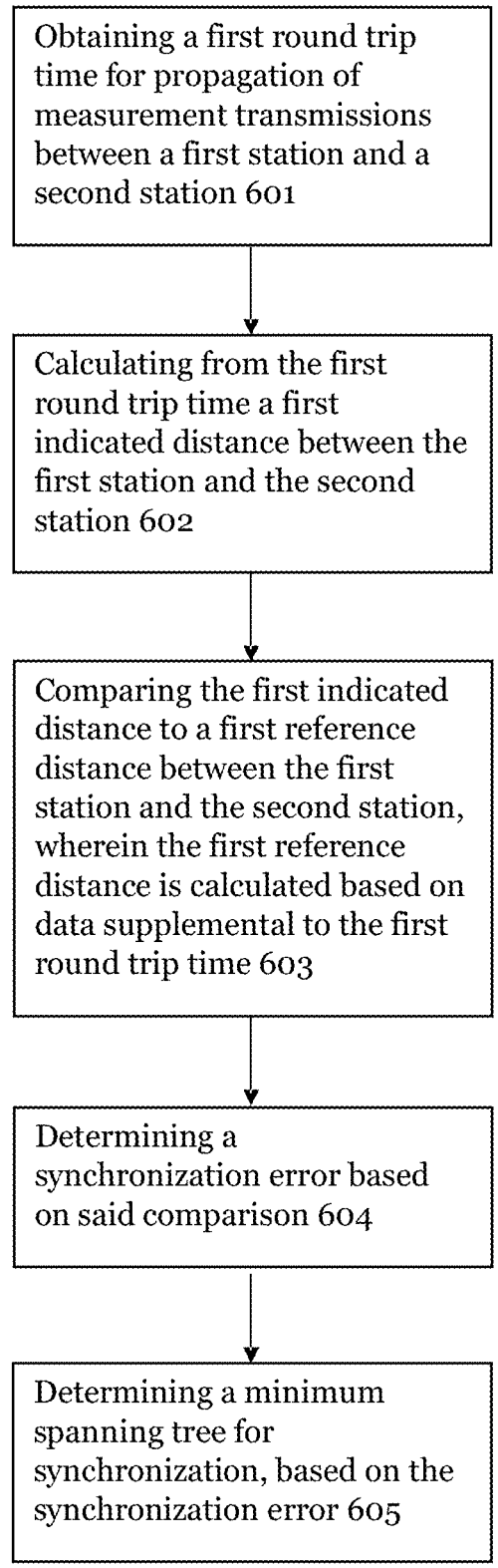
FIG. 6 shows a method for synchronizing stations in a positioning system.

FIG. 6 shows a method for synchronizing stations in a positioning system, comprising: obtaining a first round trip time for propagation of measurement transmissions between a first station and a second station 601; calculating from the first round trip time a first indicated distance between the first station and the second station 602; comparing the first indicated distance to a first reference distance between the first station and the second station, wherein the first reference distance is calculated based on data supplemental to the first round trip time 603; determining a synchronization error based on said comparison 604; and determining a minimum spanning tree for synchronization, based on the synchronization error 605.

Figure 7:
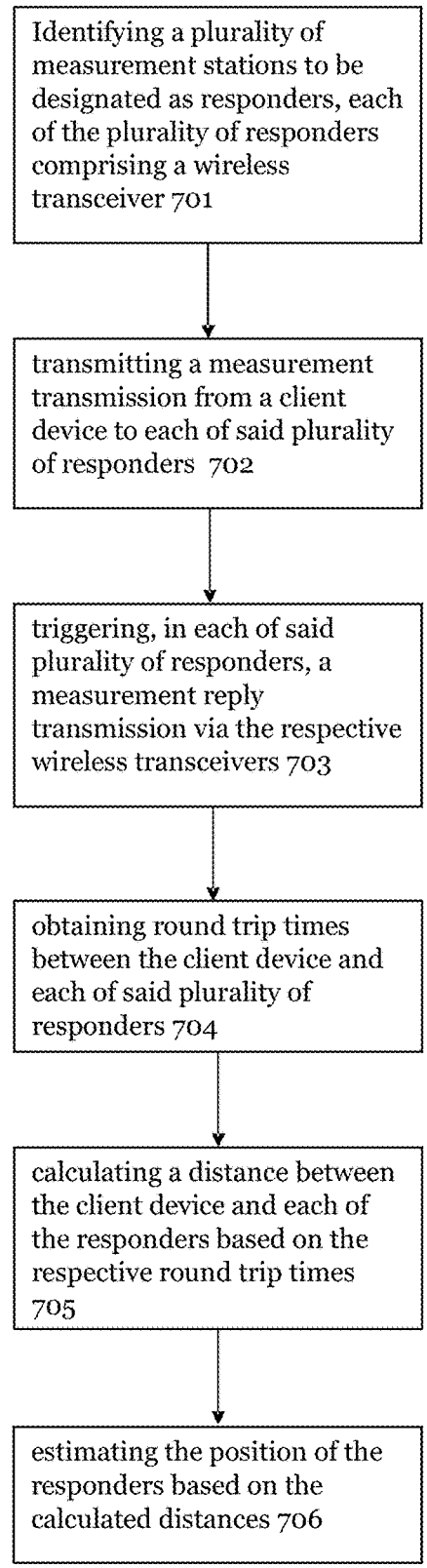
FIG. 7 shows a method for establishing a wireless positioning system.

FIG. 7 shows a method for establishing a wireless positioning system, comprising: identifying a plurality of measurement stations to be designated as responders, each of the plurality of responders comprising a wireless transceiver 701; transmitting a measurement transmission from a client device to each of said plurality of responders 702; triggering, in each of said plurality of responders, a measurement reply transmission via the respective wireless transceivers 703; obtaining round trip times between the client device and each of said plurality of responders 704; calculating a distance between the client device and each of the responders based on the respective round trip times 705; and estimating the position of the responders based on the calculated distances 706.

Figure 8:
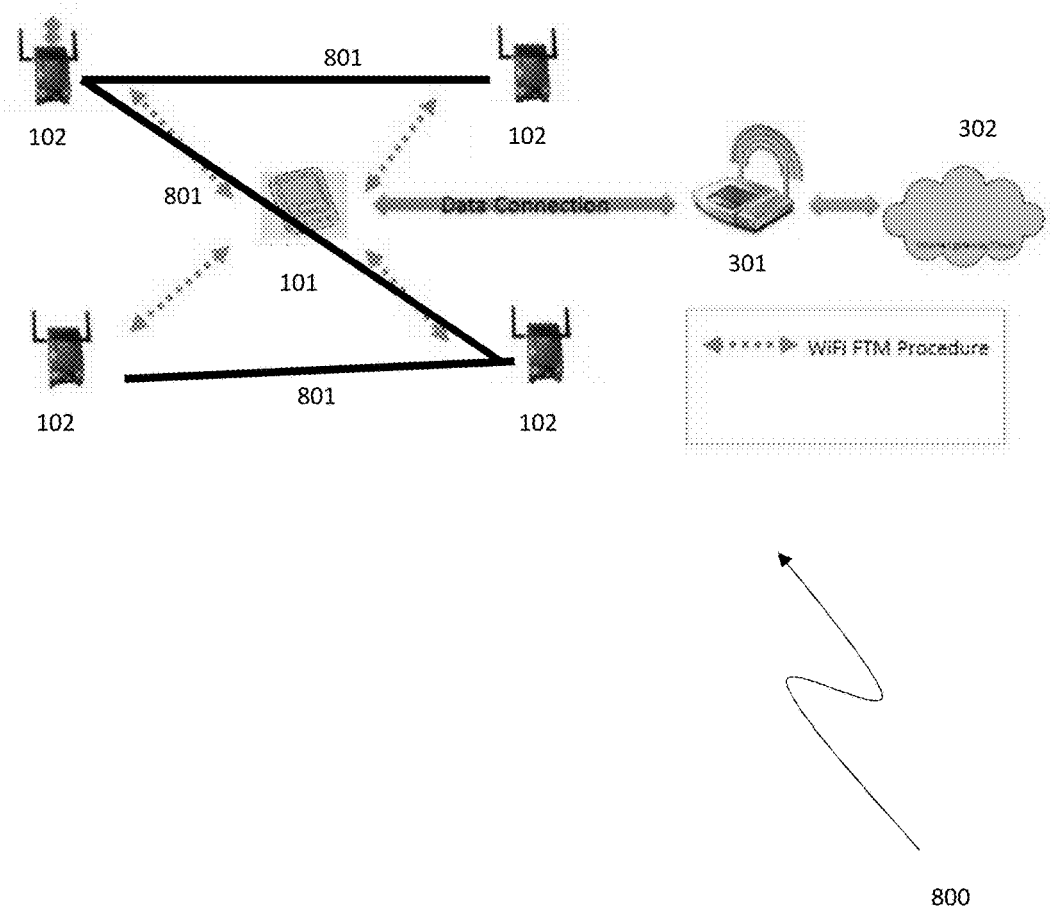
FIG. 8 shows a minimum spanning tree.

FIG. 8 shows an MST 800. According to an aspect of this Disclosure, the MST identifies a path of connections 801 between each station. The path of connections is chosen based on the rankings of synchronization error.

Moreover, according to some aspects of this Disclosure, the calculations necessary for the methods disclosed herein, including, but not limited to, the calculation of round trip times, distances, synchronization, and position, can be performed by the network, which results in user device power saving. These calculations may be performed by the responders, the TDOA Position Engine Server, or the Sensing Network Managing Entity. Alternatively, the positioning network can be configured such that the calculations are performed by the client device.

Where TDOA is used for a legacy client device transmission 505 or another device not using FTM, a client device transmits an identifiable frame, such as a probe request, which is then received by multiple responders 506. Upon receiving the request, the multiple responders track their respective reception time of the transmission. The difference between the respective reception times of each network element is fed into a hyperbolic equation-set, which is assessed by a network managing entity. During the positioning estimation by the network managing entity 507, the network managing entity performs trilateration on the equation set with known positions of the responders, whereby the client device position is calculated. The position may be shared with the client device. Stages 501, 502, and 503 may be repeated periodically to maintain and improve the overall accuracy of the location estimation system.

Throughout this Disclosure, the term "responders" is used to designate the elements between which the round trip time, distance, and/or synchronization errors are calculated. These are also referred to as "network sensing elements" or "stations." Generally speaking, a "responder" is intended to be a station that responses to a request. Where the term "initiator" is present, the initiator is a station that initiates a request. Nevertheless, the uses of station, network sensing element, responder, and initiator is not intended to be limiting.

The term "round trip time" is used throughout this disclosure to describe the time required for a signal to travel from one station to another, and then back to the first station. It is appreciated, however, that the receiving station may create additional delays, such as processing time, which would then be embedded within the calculation of round trip time. Accordingly, the round trip time calculation includes both time of flight and processing time. Under at least one aspect of the Disclosure, a delay to accommodate for processing time can be included in the measurement, such that the signal travels from the first station to the second station; the second station waits for a predetermined period of time; and then the second station transmits the data to the first station at the conclusion of the predetermined amount of time. This delay is an optional means to address the issue of delay that may arise in the processing and measurement of a round trip time.

A first method of establishing a positioning system comprises a method for synchronizing responders in a positioning system, comprising: obtaining a round trip time between two responders; calculating from the round trip time a first distance between the two responders; calculating from locations of the elements a second distance between the responders; determining a synchronization error by comparing the first distance to the second distance; and determining a minimum spanning tree for synchronization, based on the synchronization error.

This method requires transmission between a plurality of responders. These network responders are configured to discover other responders in their vicinity. This discovery takes into account the limitations of wireless communication, whereby the reach of wireless signal is finite, and whereby obstructions, interference, and the like may prevent transmission between responders that may otherwise be within a satisfactory proximity for transmission. This method may be conducted in situations where all responders in a positioning system cannot communicate with all other responders in the positioning system, which thereby offers an amount of flexibility in the placement, set-up, and arrangement of responders. The responders may locate one another through any suitable discovery procedure. A non-exhaustive list of discovery procedures that are contemplated includes Wi-Fi 802.11 scanning and NAN discovery. As other methods of discovery become known, they may be implemented in this procedure.

Upon discovering other responders, a procedure is initiated to obtain the round trip time from one receiver to another. According to one aspect of the Disclosure, the round trip time is obtained via an FTM. This round trip time may be a true round trip time, wherein the FTM reflects the time necessary for a signal to travel from one responder to another, and then back to the first responder. Alternatively, the FTM may only measure the time to transmit a signal from one responder to another. This Disclosure specifically contemplates incorporating other standards and measurements, whatever means employed, to calculate the transmission time between responders. According to one embodiment, the FTM will be performed as an 802.11 Fine Timing Measurement, which is a known standard in the art.

According to one aspect of the disclosure, the FTM timing entries are accompanied with a responder identifier. The combination of FTM timing entry and responder identifier allows for the timing data to be linked to a specific responder and permits subsequent calculations of the round trip times and distances between the various responders.

The FTM or round trip time provides a means to calculate the distance between responders. It is known in the art that the wireless signal generally travels at the speed of light. Based on the known formula that distance=velocity·time, the multiplication of the round trip time with the speed of light will yield an estimation of distance. Where the actual round trip time is used, this formula will yield twice the distance between the responders, which will then need to be halved for the remaining calculations. This method considers that the signal may be influenced by factors that cause the signal to travel at a velocity slightly slower than the speed of light, or that the processing time to receive and return a signal creates at least some delay. Taking these factors into account, however, the resulting estimated distance from this equation is expected to be acceptably accurate for the purposes explained herein.

This method also relies on the accurate input of LCI. LCI may be inputted directly into the responders, or the LCI may be stored elsewhere, such as in the TDOA Position Server. According to one aspect of the Disclosure, the LCI may comprise latitude and longitude. According to another aspect of the Disclosure, the LCI may further comprise an altitude. According to another aspect of the Disclosure, the LCI may comprise Earth-centered Earth Fixed data or Earth-centered Rotational data. According to another aspect of the Disclosure. the LCI may comprise distance from a known landmark. The use of LCI provides a very exact geographical location that can then be used to measure distance between the responders. In an indoor installation, known methods of calculating positions, such as GNSS, may not be suitable or available, and therefore the LCI will have to otherwise be inputted for use in this system. Where a responder is moved after the LCI is entered, the LCI must be updated or reentered so as to reflect the correct position of the responder.

According to one aspect of the Disclosure, the LCI is understood to be an absolute position, such as previously described, whereby at least latitude and longitude are entered. According to another aspect of the Disclosure, however, the LCI may comprise relative location, such as the measured distance between responders. This could include accurate distance within the network, even where this is not tied to a geographical location outside of the network.

According to one aspect of the Disclosure, the LCI data, or other locational data, is transmitted separately from the FTM or round trip time data. It may be transmitted directly from the responder, or it may be transmitted from the TDOA Position Engine Server, or otherwise. Alternatively, the LCI or locational data may not be transmitted at all. For example, the LCI may be stored in the TDOA Position Engine Server, or other server, CPU or database where the distance calculations are performed. Under this circumstance, no transmission of the LCI data may be necessary. According to another aspect of the Disclosure, the LCI or location data may be transmitted in the Fine Timing Measurement calculations. The LCI may be transmitted along with, or embedded within, the FTM. An alternative method for obtaining LCI is the Access Network Query Protocol, which is a known protocol in the art. As other protocols or means for requesting or receiving LCI become known, it is anticipated that they may too be implemented in this method.

With the LCI corresponding to two responders, the distance between said responders can be calculated through a variety of methods known in the art. One such method is to solve for the distance between two points. According to one aspect of the disclosure, LCI is used to calculate the distance between each responder and every other responder.

The distances obtained via FTM and LCI may be stored in memory for later calculation. It is anticipated that one or more distances will be used to calculate the position of a client device.

With the distance between responders calculated using round trip time ("first distance") and the distance between responders being calculated using LCI ("second distance"), first distance is compared with the second distance. Assuming correct LCI, the distance between responders can be calculated to a very high degree of accuracy using LCI. Again, assuming accurate LCI, to the extent that the first distance differs from the second distance, that difference can primarily be attributed to synchronization error.

By comparing the first distance with the second distance, the magnitude of the synchronization error can be assessed. This can be performed, for example, by subtracting one distance from the other. The first distance and the second distance are compared for the available distances between every responder and every other responder. By performing these operations, the synchronization errors between each connection between responders can be assessed.

Once the synchronization errors between each connection are assessed, they are graded or ranked. According to one aspect of the Disclosure, the synchronization errors are ranked from smallest to largest. Where two synchronization errors are identical, the distances between the corresponding responders are assessed, and the synchronization error that corresponds to the shorter distance is given a higher ranking than the synchronization error that corresponds to the longer distance.

The evaluation of the synchronization error may be performed in a variety of locations. The TDOA Position Engine Server is disclosed as carrying out the calculations of distance and synchronization error. This TDOA Position Engine Server may be a separate server or CPU, whether within or outside of the wireless network of responders. It may be connected to the responders via a wireless network, through Local Area Network connection, through a connection over the Internet, or otherwise. According to another aspect of the Disclosure, the TDOA Position Engine Server may be located within a responder. It may be located within a client device that it brought into the wireless network. The TDOA Position Engine Serve may be software that is stored in or with a responder, a client device, a CPU, or a server.

With the ranking of synchronization errors, a minimum spanning tree ("MST") can be calculated. An MST is a spanning tree of a connected, undirected graph that connects all the vertices together with the minimal total weighting for its edges. The MST is known in the art, and there are a variety of algorithms with which to calculate a MST. A method for calculated a MST can be selected based on the speed, processing demands, output, or any other factor relevant to the specific implementation.

The MST dictates the order in which the responders will be synchronized. Where a high level of synchronization is crucial, such as in a large scale indoor positioning system, a synchronization tree provides a crucial means to decide which pairs or responders are to be time synchronized with one another. A synchronization tree can prevent unnecessary duplicity or redundancy in synchronizing efforts, and it can perform synchronization through the most efficient means possible. This can result in high accuracy of time synchronization, which may be of crucial importance in a positioning system based on FTM or TDOA. A variety of methods to synchronize are known in the art. This method is rather to determine a synchronization tree that best calculates the order of synchronization.

Even where highly accurate synchronization has been obtained, it is expected that the various responders will eventually drift out of synchronization, or beyond an acceptable predetermined synchronization threshold. The positioning system must be periodically reevaluated by obtaining a new round trip time between responders; determining a new first distance between the responders based on the new round trip time; and re-determining a minimum spanning tree for synchronization, based on a comparison of the new round trip time and the second distance. Where additional synchronization is necessary, the system can be re-synchronized according to the updated synchronization tree.

According to another aspect of the disclosure, other occurrences may require reevaluation of the positioning system and/or re-synchronization. For example, a responder may fail for any number of reasons, including, but not limited to, power loss, power surge, mechanical damage, exceeding useful life, or environmental conditions. Where a responder fails, it may be advantageous to re-synchronize.

Re-synchronization may become advantageous where the position of a responder is changed. This system requires accurate LCI that correctly reports the location of the responders. In many installations, the LCI must be entered manually, and therefore the physical relocation of a responder may require a corresponding update of the LCI. Where the position changes, recalculation of the MST and/or re-synchronization may be required.

Re-synchronization may also become advantageous where there are changes to physical objects within the positioning system. Changes to the environment, such as the introduction or large objects, large number of people, or devices that may cause interference or otherwise complicate transmission over a wireless network may require re-synchronization. This may also include changes to the physical structure of a building where a positional system is installed. For example, some rooms are constructed with moveable walls or dividers, such that the room can serve a variety of purposes and be arranged in a variety of configurations. The addition or subtraction of walls may require re-synchronization.

This method of time synchronization may allow for highly-accurate time synchronization over both a small network and over a large deployment. The efficiency of the MSP may increase accuracy by preventing unnecessary transmission delay between responders. This method may enable indoor positioning systems that cannot utilize GNSS. This method may create time synchronization to permit effective use of an indoor positioning system based on Time Difference of Arrival.

This method enables time synchronization over a large deployment. It may prevent unnecessary transmission between responders. It enables accurate indoor location over a large scale. The method permits indoor Time Difference of Arrival positioning system.

According to another aspect of the disclosure, a method for establishing a wireless positioning system is disclosed, said method comprising obtaining a timing information between a client device and a plurality of responders; storing the timing information in a memory; and estimating the position of the responders based on the timing reading. This method permits for relative positioning where a client device locomotes through a wireless positioning network. This method relies on FTM, or other means of establishing a round trip time, for calibration; however, after calibration, the system can be used for non-FTM-compliant devices, such as legacy client devices.

According to one aspect of the disclosure, the method utilizes an FTM-enabled device for calibration purposes. Alternatively, this may be a device that is capable of a round trip time calculation.

The plurality of responders in this method are wireless network elements. These may be Wi-Fi enabled stations to transmit or receive wireless data. They may use Bluetooth or any other known method of wireless communication. They may be calculated to transmit data to a client device, or receive data from a wireless device.

According to one aspect of the disclosure, this method is used with at least one client device, as the client device travels or locomotes through the positioning network. This is achieved by collecting a plurality of timing entries (timing information), such as round trip time, FTM, or TDOA, and then employing an algorithm such as a SLAM algorithm to calculate the relative position of the responders within the network. The multiple timing entries permit a triangulation or trilateration whereby the multiple data sets permit a convergence upon the location of the responders.

Wi-Fi FTM is primarily designated for highly-accurate indoor positioning purposes. For example, 802.11 RevMC 10.24.6.1 states that "[t]he fine timing measurement procedure allows a STA to obtain its range to another STA. In order for a STA to obtain its location, the STA may perform this procedure with multiple STAs whose locations are known."

The transmission of the timing entries is achieved via known methods. According to one aspect of the disclosure, the timing entries are accompanied with a responder identifier, such that the timing data can be attributed to the distance between the client device and a specific responder.

According to another aspect of the Disclosure, this method is used with a plurality of client devices that may be moving or stationary. Each location of client device provides a new data set which can be used to converge upon the location of the responders. Whether the data sets are obtained through a single client device or multiple client devices, and whether a client device is locomoting or stationary, the method relies on a plurality of timing entries between a client device and a plurality of responders, taken from a plurality of locations.

The timing information may be obtained with any method means for obtaining transmission time between a client device and a responder. One such means may be a round trip time calculation. According to one aspect of the Disclosure, round trip time may be assessed by FTM. According to another aspect of the disclosure, the timing information may be obtained by Wi-Fi Time of Flight Technology data. According to another aspect of the disclosure, the timing information may be obtained by Time Difference of Arrival Data.

Once obtained, an algorithm is used to determine the relative positions of the responders using the plurality of time information entries. One suitable algorithm for such calculation is a SLAM algorithm, which is designed to construct a map of an unknown environment while simultaneously tracking the location of a client device within the map. This algorithm permits the use of multiple timing entries between a client device and a plurality of responders, wherein the timing entries comprise FTM, round trip time, or otherwise, to converge on the location of the responders. This may be achieved even where an absolute location of the responders is not known. Where there is no known absolute location, the algorithm will converge upon a relative location of the responders. This may comprise creating a map, wherein the locations of the responders are displayed in relation to each other. This may alternatively comprise a list of coordinates identifying the location of the responders to each other.

According to another aspect of the Disclosure, where one absolute location of a responder and additional locational data are known, the absolute locations of the remaining responders may be estimated based on a reference to the known absolute location. This absolute location may be obtained through any means including, but not limited to, LCI, direct input of the location, partial global navigation satellite systems readings, or otherwise. The additional data may comprise the absolute location of a second responder, magnetic readings, or partial When the location or position of the responders is obtained, the responders should be time-synched to permit location through other means. For example, once the locations of the responders have been calculated, it would be possible to obtain the location of subsequent client devices using other methods, such as TDOA. However, many other methods, such as TDOA, require very accurate time-synchronization between devices. Thus, it may be necessary to perform time synchronization to allow for the positioning of subsequent devices, particularly where the subsequent devices are not FTM enabled.

According to one aspect of the disclosure, the responders may be time synchronized using 802.11 Fine Time Measurements between pairs of responders. To achieve this, the FTM measurements can be converted into approximate distance measurements by multiplying one half of the round trip time by the speed of light. The pair-wise distances that were determined with SLAM positioning can be compared with the distances calculated from the FTM procedure. Where these distance calculations differ, much of the difference may be attributed to time-sync error. By ascertaining the presence and magnitude of time synch error, a time synchronization can be performed. There are many known methods of time synchronization, and a suitable method can be chosen as desired.

The positioning system may also determine the location of the client device. This may occur in implementations where no absolute position is known, and therefore the position of the client device will be determined in reference to the locations of the responders. Alternatively, where at least one absolute position of a responder is known, the absolute position of the client device may be determined.

The ability to map or to ascertain the location of a client device can be extended to subsequent client devices. Once the relative locations of the responders have been determined, the location or position of subsequent client devices can be determined comparatively. Unlike the initial setup and convergence, this procedure requires a single communication between the client device and a plurality of responders. This may be an FTM, a round trip time, a TDOA, or another other method that can be used to calculate the distance between the client device and a plurality of responders. Using the existing location or positional data of the responders, along with the data showing the distance between the client device and the responders, the location of the client device within the network of responders can be identified. This can be achieved even where a second or subsequent client device is not FTM compliant or is a legacy device.

The following Examples pertain to various aspects or embodiments of the disclosure.

In Example 1, a method for synchronizing stations in a positioning system, comprising:
obtaining a first round trip time for propagation of measurement transmissions between a first station and a second station;
calculating from the first round trip time a first indicated distance between the first station and the second station;
comparing the first indicated distance to a first reference distance between the first station and the second station, wherein the first reference distance is calculated based on data supplemental to the first round trip time;
determining a synchronization error based on said comparison; and
determining a minimum spanning tree for synchronization, based on the synchronization error.

In Example 2, the method of claim 1, wherein the first station is an initiating station and the second station is a responding station, and wherein the synchronization error is a synchronization error for the second station.

In Example 3, the method of claim 1 or 2, wherein the data supplemental to the first round trip time is independent of the first round trip time.

In Example 4, the method of any of Examples 1 to 3, wherein the data supplemental to the first round trip time is geographic location data.

In Example 5, the method of Example 4, wherein the geographic location data includes data related to latitude and longitude.

In Example 6, the method of any of Examples 1 to 5, further comprising:
determining a first geographic location corresponding to the first station;
determining a second geographic location corresponding to the second station;
calculating the first reference distance of the first geographic location and the second geographic location.

In Example 7, the method of Example 1, further comprising discovering the first station and the second station from which to obtain the first round trip time.

In Example 8, the method of Example 7, wherein at least one of the first station or the second station is discovered via a WiFi 802.11 Scanning Procedure.

In Example 9, the method of Example 7, wherein at least one of the first station or the second station is discovered via a Neighbor Awareness Network Protocol.

In Example 10, the method of any one of Examples 1 to 5, wherein the first round trip time is obtained by Fine Timing Measurement.

In Example 11, the method of Example 10, wherein the Fine Time Measurement is an 802.11 Fine Timing Measurement.

In Example 12, the method of any one of Examples 1 to 5, 10, or 11, further comprising calculating the first indicated distance between the first station and the second station based on the round trip time.

In Example 13, the method of any one of Examples 1 to 12, wherein the first indicated distance is equal to about half the round trip time multiplied by the speed of light.

In Example 14, the method of any one of Examples 4 to 6, wherein the geographic location data comprises Location Configuration Information.

In Example 15, the method of any one of Examples 4 to 6, or 14, wherein the geographic locations are absolute locations.

In Example 16, the method of any one of Examples 4 to 6, 14, or 15, wherein the geographic locations are manually inputted absolute locations.

In Example 17, the method of any one of Examples 4 to 6, or 14 to 16, wherein the geographic locations comprise a longitude, a latitude and an altitude.

In Example 18, the method of any one of Examples 4 to 6, or 14 to 17, further comprising the geographic locations being transmitted in the Fine Timing Measurement.

In Example 19, the method of Example 14, further comprising the Location Configuration Information being queried via Access Network Query Protocol.

In Example 20, the method of any one of Examples 1 to 19, further comprising comparing the first distance between responders and the second distance between responders yielding an estimated synchronization error for the responders.

In Example 21, the method of Example 20, further comprising determining a synchronization error for each combination of responders.

In Example 22, the method of any one of Example 21, further comprising listing the synchronization errors.

In Example 23, the method of Example 22, further comprising ranking the synchronization errors.

In Example 24, the method of Example 22 or 23, further comprising grading the synchronization errors obtained from comparing the first distance between responders and the second distance between responders.

In Example 25, the method of any one of Examples 20 to 24, further comprising ranking synchronization errors from the smallest synchronization error to the greatest synchronization error.

In Example 26, the method of any one of Examples 23 to 25, further comprising, where two synchronization errors are identical, and selecting for a higher ranking the synchronization error that corresponds to a shorter second distance between responders.

In Example 27, the method of any one of Examples 23 to 26, further comprising a responder performing the evaluation of the synchronization error.

In Example 28, the method of any one of Examples 23 to 27, further comprising a Central Processing Unit performing the evaluation of the synchronization error.

In Example 29, the method of any one of Examples 1 to 28, further comprising calculating the minimum spanning tree with an algorithm.

In Example 30 the method of any one of Examples 1 to 29, further comprising synchronizing the responders according to the minimum synchronization tree.

In Example 31, the method of any one of Examples 1 to 30, further comprising periodically reevaluating the positioning system.

In Example 32, the method of Example 31, further comprising periodically reevaluating the positioning system by obtaining a new round trip time between responders in a positioning system; determining a new first distance between the responders based on the new round trip time; and re-determining a minimum spanning tree for synchronization, based on a comparison of the new round trip time and the second distance.

In Example 33, the method of Example 31 or 32, further comprising reevaluating the positioning system due to a failure of a responder.

In Example 34, the method of Example 31 or 32, further comprising reevaluating the positioning system due to a change in position of a responder.

In Example 35, the method of Example 31 or 32, further comprising reevaluating the positioning system due to changes to physical objects within the positioning system.

In Example 36, the method of Example 31 or 32, further comprising reevaluating the positioning system due to changes to the physical structure of a building where the positioning system is located.

In Example 37, the method of Example 31 or 32, further comprising reevaluating the positioning system where a clock drift exceeds a predetermined threshold.

In Example 38, the method of any one of Examples 1 to 37, wherein the positioning system is an indoor positioning system In Example 39, a method for establishing a wireless positioning system, comprising:
  identifying a plurality of measurement stations to be designated as responders, each of the plurality of responders comprising a wireless transceiver;
  transmitting a measurement transmission from a client device to each of said plurality of responders;
  triggering, in each of said plurality of responders, a measurement reply transmission via the respective wireless transceivers;
  obtaining round trip times between the client device and each of said plurality of responders;
  calculating a distance between the client device and each of the responders based on the respective round trip times; and
  estimating the position of the responders based on the calculated distances.

In Example 40, the method of Example 39, wherein the client device is a mobile communications device.

In Example 41, the method of claim 40, wherein the mobile communications device is a Fine Time Management enabled device.

In Example 42, the method of any one of Examples 39 to 41, wherein the responders are Wi-Fi network elements.

In Example 43, the method of any one of Examples 39 to 42, further comprising obtaining round trip times from a plurality of locations of the client device.

In Example 44, the method of any one of Examples 39 to 43, further comprising obtaining a first set of round trip times when the client device is stationary.

In Example 45, the method of any one of Examples 39 to 44, further comprising changing the location of the client device between obtaining the first set of round trip times and obtaining a second set of round trip times.

In Example 46, the method of Examples 49 to 45, wherein the round trip times comprise Wi-Fi Time of Flight Technology data.

In Example 47, the method of any one of Examples 49 to 45, wherein the round trip times comprise Time Difference of Arrival Data.

In Example 48, the method of any one of Examples 49 to 45, wherein the round trip times comprise Observed Time Difference of Arrival Data.

In Example 49, the method of any one of Examples 49 to 45, wherein the round trip times comprise Fine Time Measurement data.

In Example 50, the method of any one of Examples 39 to 49, further comprising an algorithm using the round trip times to estimate the position of the responders.

In Example 51, the method of any one of Examples 39 to 50, wherein the second set of round trip times is different from the first set of round trip times.

In Example 52, the method of any one of Examples 39 to 51, further comprising estimating the position of the responders by evaluating changes in the round trip times that result from the moving client device.

In Example 53, the method of any one of Examples 39 to 52, wherein the position of the responders is estimated using Simultaneous Localization and Mapping ("SLAM").

In Example 54, the method of any one of Examples 39 to 53, further comprising mapping the locations of the responders using the round trip times.

In Example 55, the method of Example 54, wherein the mapping of the locations of the responders comprises the relative locations of the responders to each other.

In Example 56, the method of any one of Examples 39 to 55, further comprising calculating, based on the relative locations of the responders, at least one absolute location of a responder, and at least some other geographical information, the absolute locations of responders.

In Example 57, the method of any one of Examples 1 to 56, further comprising determining a location of a second client device using the mapped locations of the responders obtained from a first device.

In Example 58, the method of Example 57, further comprising a second client device being a non-FTM enabled device.

In Example 59, the method of any one of Examples 1 to 58, wherein an absolute location of a first responder is known, and an absolute location of a second responder is determined using the absolute location of the first responder and the estimated position of the responder.

In Example 60, the method of any one of Examples 39 to 59, further comprising calculating an estimated distance between two responders based on transmission time, and comparing the estimated distance based on transmission time with the estimated distance obtained from an algorithm.

In Example 61, the method of Example 60, further comprising the comparison being an estimating a time-sync error between two responders.

In Example 62, the method of any one of Examples 39 to 61, wherein the round trip time is transmitted via Wi-Fi.

In Example 63, the method of any one of Examples 39 to 61, wherein the round trip times is transmitted via Bluetooth.

In Example 64, an apparatus for establishing a positioning system, comprising:
a logical circuit;
a memory; and
a wireless area network transceiver;
wherein the logical circuit is configured to:
obtain a round trip time between responders in a positioning system;
determine a first distance between responders based on the round trip time;
obtain locations of the responders;
determine a second distance between responders based on the locations of the responders;
compare the first distance between responders with the second distance between responders;
and determine a minimum spanning tree for synchronization, based on the comparison of the first distance and the second distance;
the memory is configured to store the round trip time and the locations of the responders; and
the transceiver is configured to send or receive transmissions with the responders.

In Example 65, the apparatus of Example 64, wherein the apparatus for is a Position Engine Server.

In Example 66, the apparatus of Example 65, wherein the Position Engine Server is a CPU In Example 67, the apparatus of Example 65 or 66, wherein the Position Engine Server is located within a responder.

In Example 68, the apparatus of any one of Examples 65 to 67, wherein the Position Engine Server is software.

In Example 69, the apparatus of any one of Examples 64 to 68, wherein the responder is a wireless Sensing Network Element.

In Example 70, the apparatus of any one of Examples 64 to 69, wherein the round trip time is a Fine Time Measurement.

In Example 71, the apparatus of any one of Examples 64 to 70, wherein the round trip time is an 802.11 RevMC Fine Time Measurement.

In Example 72, the apparatus of any one of Examples 64 to 71, wherein the round trip time is an 802.11 RevMC 12.24.6.1 Fine Time Measurement.

In Example 73, the apparatus of any one of Examples 64 to 72, wherein the logical circuit is further configured to calculate a distance between two objects by calculating the round trip time relative to the speed of light.

In Example 74, an apparatus for a wireless positioning system, comprising:
a wireless area network transceiver;
a logical circuit;
a memory, configured to store data;
wherein, the wireless area network transceiver is configured to obtain round trip times between a client device and a plurality of responders;
wherein, the logical circuit is configured to determine positions of the responders using the round trip times; and
wherein, the memory is configured to store the positions of the responders.

In Example 75, the apparatus of Example 74, wherein the apparatus for a positioning system is a sensing network managing entity.

In Example 76, the apparatus of Example 75, wherein the sensing network managing entity is a CPU.

In Example 77, the apparatus of Example 75, wherein the sensing network managing entity is located within a responder.

In Example 78, the apparatus of Example 75, wherein the sensing network managing entity is software.

In Example 79, the apparatus of any one of Examples 74 to 78, wherein the round trip times are received from a client device.

In Example 80, the apparatus of Example 79, wherein the client device is an FTM-enabled device.

In Example 81, the apparatus of Example 79 or 80, wherein the client device is a wireless terminal device.

In Example 82, the apparatus of any one of Examples 79 to 81, wherein the client device transmits round trip times from a plurality of locations.

In Example 83, the apparatus of any one of Examples 74 to 82, wherein the round trip times are received from a responder.

In Example 84, the apparatus of Example 83, wherein the responder is a wireless Sensing Network Element.

In Example 85, the apparatus of any one of Examples 74 to 84, wherein the round trip times are transmitted between a client device and a Wi-Fi Responder.

In Example 86, the apparatus of any one of Examples 74 to 85, wherein the round trip times are Fine Time Measurements.

In Example 87, the apparatus of Example 86, wherein the round trip time is an 802.11 RevMC Fine Time Measurement.

In Example 88, the apparatus of any one of Examples 74 to 87, wherein the Fine Time Measurement information is transmitted between a client device and a Wi-Fi Responder.

In Example 89, the apparatus of Example 86, wherein the round trip time is an 802.11 RevMC 12.24.6.1 Fine Time Measurement.

In Example 90, the apparatus of any one of Examples 74 to 89, wherein the logical circuit is further configured to calculate a distance between two objects by calculating the round trip time relative to the speed of light.

In Example 91, the apparatus of any one of Examples 74 to 90, wherein the logical circuit is configured to receive round trip times from fixed stations with known positions.

In Example 92, the apparatus of any one of Examples 74 to 91, wherein the logical circuit is configured to determine the positions of a responder based on the relative position of the responder and at least one absolute position of a responder in a same positional network.

In Example 93, the method of any one of Examples 74 to 92, further comprising an estimated position of the responder being used to determine a position of a second client device.

In Example 94, the method of any one of Examples 74 to 93, further comprising the second client device being a non-FTM enabled client device.

In Example 95, the method of any one of Examples 74 to 94, further disclosing the round trip time being obtained from a plurality of client devices and a plurality of responders.

In Example 96, the method of Example 95, further disclosing one or more of the plurality of client devices locomoting while transmitting the timing information.

In Example 97, the method of Example 95, further disclosing one or more of the plurality of client devices being stationary while transmitting timing information.

In Example 98, the method of any one of Examples 74 to 97, wherein the receipt of timing information occurs via crowdsourcing.

In Example 99, a means to establish a positioning system, comprising:
 a circuit to obtain a round trip time between responders in a positioning system; a determiner to calculate a first distance between responders based on the round trip time;
 a receiver to receive transmission of locations of the responders;
 a determiner to calculate a second distance between responders based on the locations of the responders;
 a circuit to compare the first distance between responders with the second distance between responders; and
 a circuit to determine a minimum spanning tree for synchronization, based on the comparison of the first distance and the second distance.

In Example 100, a means for establishing a positioning system, comprising:
 a circuit to obtain a timing information between a client device and a plurality of responders;
 a memory to store the timing information; and
 a circuit to estimate the position of the responders based on the timing reading.

In Example 101, a means for establishing a wireless positioning system, comprising:
 a transceiver to receive timing information from at least one responder or client device;
 a circuit to localize an object based on timing information; and a memory to store the localization of the object.

In Example 102, a means for establishing a positioning system, comprising:
 a logical circuit;
 a memory; and
 a wireless area network transceiver;
 wherein the logical circuit:
 obtains a round trip time between responders in a positioning system;
 determines a first distance between responders based on the round trip time; obtains locations of the responders;
 determines a second distance between responders based on the locations of the responders;
 compares the first distance between responders with the second distance between responders;
 and determines a minimum spanning tree for synchronization, based on the comparison of the first distance and the second distance;
 the memory stores the round trip time and the locations of the responders; and
 the transceiver sends or receives transmissions with the responders.

In Example 103, a non-transient computer readable medium containing program instructions for causing a computer to perform the method of:
 obtaining a round trip time between responders in a positioning system;
 determining a first distance between responders based on the round trip time;
 obtaining locations of the responders;
 determining a second distance between responders based on the locations of the responders;
 comparing the first distance between responders with the second distance between responders; and
 determining a minimum spanning tree for synchronization, based on the comparison of the first distance and the second distance.

In Example 104, a non-transient computer readable medium containing program instructions for causing a computer to perform the method of:
 obtaining a timing information between a client device and a plurality of responders;
 storing the timing information in a memory; and
 estimating the position of the responders based on the timing reading.

In Example 105, a machine readable medium including code, when executed, to cause a machine to perform the method of any one of the above examples.

In Example 1066, the method of any one of Examples 38 to 61, further comprising the estimated position of the responders allowing for a non-FTM-enabled device to receive positional data using an alternative protocol.

In Example 107, the method of Example 106, wherein the alternate protocol is Time Difference of Arrival.

In Example 108, the method of Claim 38, wherein the round trip times are calculated from a plurality of locations of the client device.

In Example 109, the method of Claim 38, wherein the round trip times are calculated from locations of a plurality of client devices.

What is claimed is:

1. A method for synchronizing stations in a positioning system, comprising:
    obtaining a first round trip time for propagation of measurement transmissions between a first station and a second station;
    calculating from the first round trip time a first indicated distance between the first station and the second station;
    comparing the first indicated distance to a first reference distance between the first station and the second station, wherein the first reference distance is calculated based on data supplemental to the first round trip time;
    determining a synchronization error based on said comparison; and
    determining a minimum spanning tree for synchronization, based on the synchronization error.

2. The method of claim 1, wherein the data supplemental to the first round trip time comprises latitude and longitude.

3. The method claim 2, wherein the data supplemental to the first round trip further comprises altitude.

4. The method of claim 1, further comprising:
    determining a first geographic location corresponding to the first station;
    determining a second geographic location corresponding to the second station;
    calculating the first reference distance from the first geographic location and the second geographic location.

5. The method of claim 1, further comprising calculating the first indicated distance between the first station and the second station based on the round trip time.

6. The method of claim 1, wherein the data supplemental to the first round trip time is geographic location data, and wherein the geographic location data comprises Location Configuration Information.

7. The method of claim 1, further comprising
    determining a synchronization error for each of a plurality of combinations of stations.

8. The method of claim 7, further comprising ranking the synchronization errors.

9. The method of claim 8, further comprising, where two synchronization errors are identical, selecting for a higher ranking the synchronization error that corresponds to a shorter second distance between responders.

10. The method of claim 9, further comprising calculating the minimum spanning tree based on the ranked synchronization errors.

11. The method of claim 10, further comprising synchronizing the responders according to the minimum synchronization tree.

12. The method of claim 11, further comprising periodically reevaluating the positioning system for synchronization error.

13. An apparatus for establishing a positioning system, comprising:
    a logical circuit;
    a memory; and
    a wireless area network transceiver;
    wherein the logical circuit is configured to:
    obtain a round trip time between responders in a positioning system;
    determine a first distance between responders based on the round trip time;
    obtain locations of the responders;
    determine a second distance between responders based on the locations of the responders;
    compare the first distance between responders with the second distance between responders;
    and determine a minimum spanning tree for synchronization, based on the comparison of the first distance and the second distance;
    the memory is configured to store the round trip time and the locations of the responders; and
    the transceiver is configured to send or receive transmissions with the responders.

* * * * *